H. H. HARRISON.
MACHINE FOR VENTING CRANBERRIES AND OTHER PRODUCTS.
APPLICATION FILED NOV. 11, 1912.
1,069,946.
Patented Aug. 12, 1913.
2 SHEETS—SHEET 2.
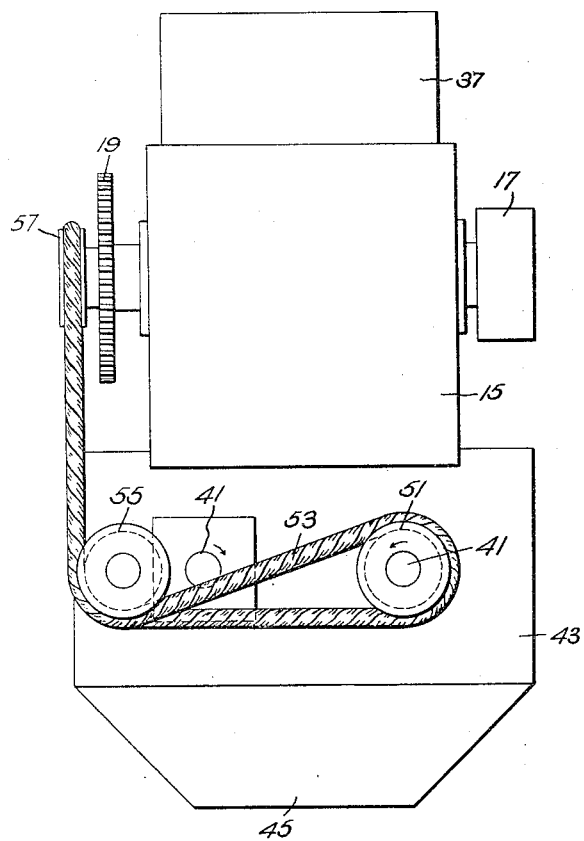
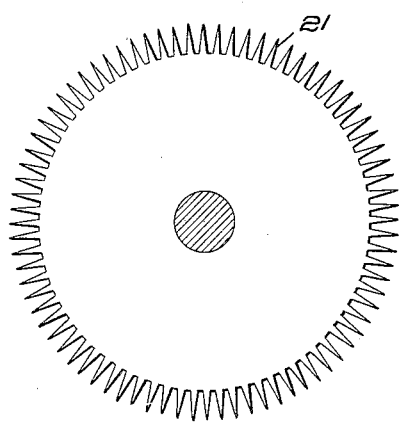
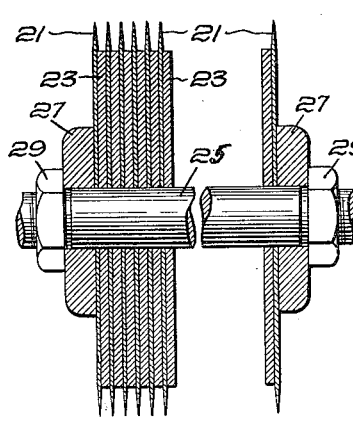
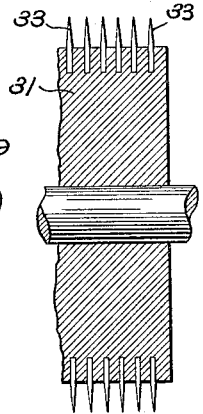
Witnesses:
Horace A. Crossman
Carl L. Choate
Inventor:
Henry H. Harrison.
by Emery, Booth, Janney & Varney
Attys.

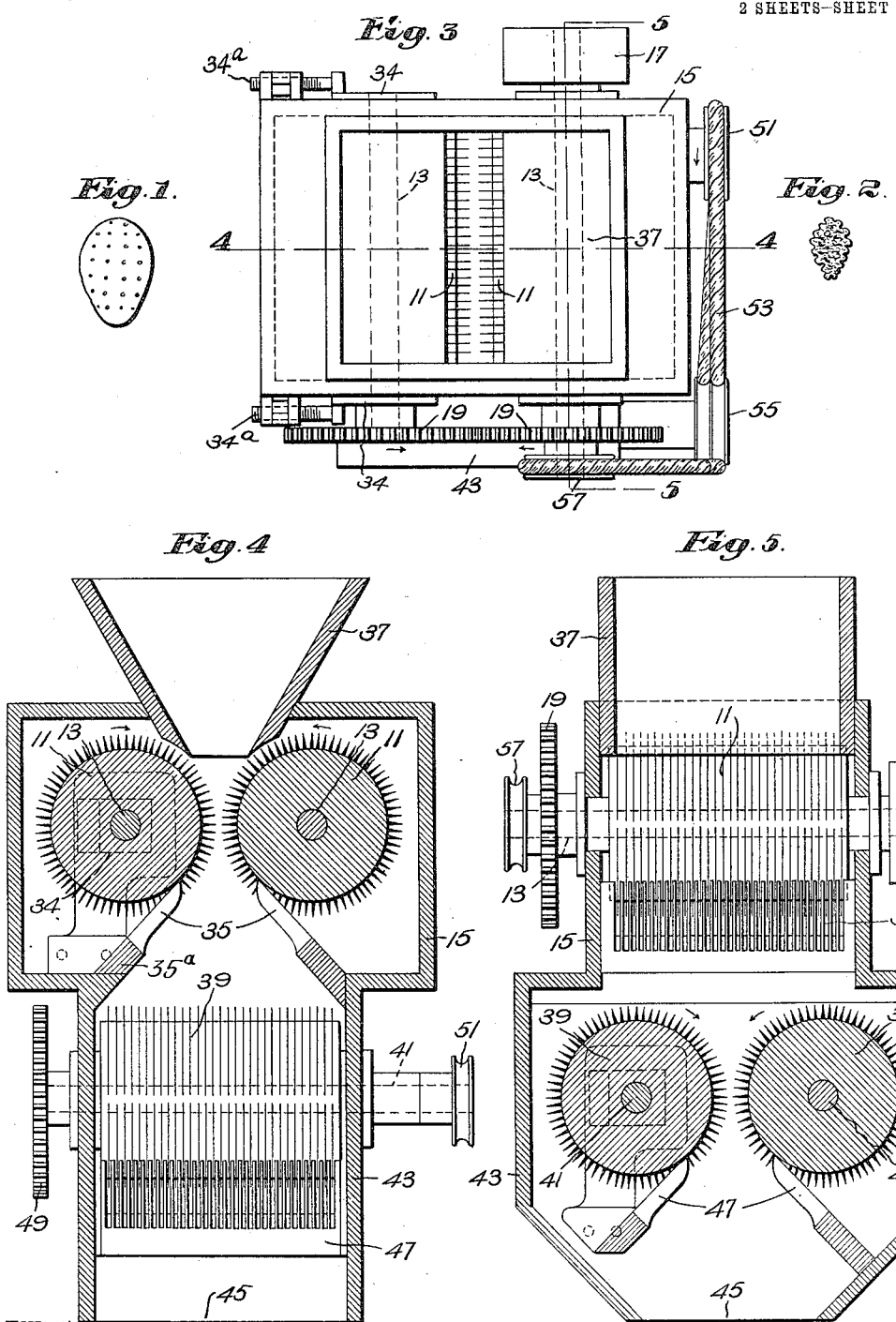

UNITED STATES PATENT OFFICE.

HENRY H. HARRISON, OF BOSTON, MASSACHUSETTS.

MACHINE FOR VENTING CRANBERRIES AND OTHER PRODUCTS.

1,069,946.  Specification of Letters Patent.  Patented Aug. 12, 1913.

Application filed November 11, 1912. Serial No. 730,602.

*To all whom it may concern:*

Be it known that I, HENRY H. HARRISON, a citizen of the United States, and a resident of Boston, county of Suffolk, and Commonwealth of Massachusetts, have invented an Improvement in Machines for Venting Cranberries and other Products, of which the following description, in connection with the accompanying drawings, is a specification, like characters on the drawings representing like parts.

This invention relates to machines for venting cranberries and other products in the manner set forth in my copending application, Serial No. 727,731, filed Oct. 25, 1912, for a dried fruit and process for drying the same.

Many attempts have been made to dry the cranberry for the purpose of preserving the same, but so far as I am aware all such attempts prior to my invention have resulted in failure, due to the exceedingly tough and impervious skin which effectively resists the escape of moisture from within the berry and which comprises a very large percentage of the composition of the berry. The berry cannot be dried, of course, unless some escape is provided for this moisture.

One of the objects of the invention is to provide a machine whereby the tough and impervious skin of the cranberry or the shell of other products may be suitably vented, thereby providing escape for the contained water or moisture, making it possible to dry the berry while still preserving the general and substantial integrity of the same, with the result that when the dried berry is subsequently treated with water or moisture it will reëxpand to resume substantially its original shape and condition.

The character of the invention may be best understood by reference to the following description of an illustrative embodiment shown in the accompanying drawings, wherein:

Figure 1 upon an enlarged scale illustrates a cranberry vented in one manner contemplated by my invention; Fig. 2 illustrates the cranberry in its dried condition; Fig. 3 is a plan of an illustrative machine for venting the product; Fig. 4 is a vertical section taken on line 4—4 of Fig. 3; Fig. 5 is a vertical section taken on line 5—5 of Fig. 3; Fig. 6 is a side elevation of the machine shown in Fig. 3; Figs. 7 and 8 are details of a roll construction to be referred to; and Fig. 9 is a modified roll construction.

Referring to the drawing, the illustrative machine there shown as embodying the invention comprises oppositely rotative rolls 11 fast on shafts 13 journaled in appropriate bearings in a casing 15. One of these shafts projects beyond the casing and receives a driving pulley 17 (Figs. 3 and 6) which may be driven in any suitable manner. To transmit the drive from one roll to the other roll the shafts of the rolls are provided with intermeshing spur gears 19, 19 of the same size whereby the rolls may be rotated in opposite directions at the same speed.

To produce a number of perforations in and through the tough and impervious skin or shell of the berry or other product each of the rolls is provided with impaling or puncturing points or projections which may be staggered if desired and penetrate the skin of the berries at numerous points as they pass between the rolls.

The roll may be constructed in different ways. One convenient form of roll comprises (Figs. 7 and 8) a plurality of thin disks 21 having impaling points milled or otherwise formed therein, said disks being separated by spacing disks 23 alternating therewith. All of these disks may be centrally apertured to receive a shaft 25 and the disks may be tightly clamped together by confining the same between heads 27 on said shaft held by nuts 29 threaded on reduced ends of said shaft.

A modified form of roll is shown in Fig. 9 comprising a cylinder 31 of wood or other suitable material fast on the shaft and having peripheral sockets in which are secured needle points 33.

The puncturing points or projections may be of a length merely sufficient to puncture the skin or shell at one side of the berry without reaching therethrough to the opposite side, but I have found it convenient and advantageous to make these prick points of a length such that they penetrate for substantial distances into the interior of the berry, and if desired they may, of course, be such as to extend completely through and puncture the berry from within at the opposite side thereof.

While puncturing in the manner last mentioned has certain points of advantage, it may be difficult to remove the impaled berries from the puncturing points, and I have found substantial results to be obtained, with greater facility in handling the berries, by employing puncturing points of a length that reach substantially through the interiors of the berries to, but not through the opposite skin faces thereof, and when so used the puncturing points tend to loosen, open up and prick down the contained contents of the skin to better enable such contents to give up the moisture in drying. Preferably the points are formed more or less conical or wedge shaped so that in puncturing the shell from without the edges of the vent openings are deflected inward in a way that causes the openings to close more or less against expansive action from within, with the result that when the berry is subjected to the action of the moisture for re-expansion the vent openings might be said to close like valves and to permit the inflation or expansion of the berry to or toward its original shape or form.

Cranberries and other products vary in size and preferably would be sifted before introduction to the machine in order to feed a substantially uniform sized product between the rolls. In order that the rolls may appropriately puncture products of different sizes or may puncture into the product to varying depths one of the rolls may be adjusted relatively to the other. This may be conveniently effected by journaling the shaft of such adjustable roll in boxes 34, which may be slid toward or from the other roll by adjusting screws 34ª. The spur gears 19, 19 referred to for transmitting the drive from one roll to another may be provided with teeth of sufficient length to permit the desired relative adjustment of the rolls described.

To clear the berries from the rolls or doff them from the impaling points, combs 35 (Fig. 4) may be provided projecting up from the base of the casing 15 so that their dents ride between the points of the rolls and effectively clear the berries from the rolls after they have been punctured and passed between the rolls. One of these combs 35 preferably is carried by brackets 35ª depending from and adjustable with the boxes of the adjustable roll.

Any suitable means may be provided for feeding the berries to the rolls, this means being typified herein as a flaring hopper 37.

In some cases it may be desired to subject the berry to a further puncturing action. To this end a second set of rolls 39 may be provided similar to the rolls 11 described, conveniently located beneath and receiving the berry as it is delivered from the first set of rolls. In order that the puncturing points of the second set of rolls may be more liable to penetrate portions of the berry not punctured by the first set of rolls the axes of the second set of rolls may be arranged transversely to the axes of the first set of rolls. The second set of rolls are mounted on shafts 41 journaled in bearings in a sub-casing 43 beneath the casing 15 and communicating therewith. The base of said sub-casing may be tapered to provide a suitable delivery mouth 45. The lower rolls may be provided with clearing combs 47 similar to those described with relation to the upper set of rolls 11. To drive the lower set of rolls their shafts 41 may be extended beyond one side of the casing 43 and receive intermeshing spur gears 49. One of the shafts 41 may be projected beyond the opposite side of the casing and receive a pulley 51, which may be driven by a flexible band 53 guided by a pair of idler pulleys 55 and driven by a pulley 57 fast on one of the shafts of the upper set of feed rolls.

In operation the berries or other product are fed into the hopper 37 and nipped between the upper set of feed rolls 11. As the berries pass between said rolls their shells are vented or punctured by the points of the rolls. The berries are then cleared from the rolls by the combs 35 and dropped to and between the second set of rolls 39, which operate to further vent the skins or shells of the berries. They are then fed on down and cleared from the rolls 39 by the combs 47 and delivered through the discharge mouth 45 into any suitable receptacle (not shown).

By my invention is provided a simple and effective mechanism whereby the skin or shell of a berry or other product may be thoroughly vented while the substantial integrity or entirety of the berry is maintained.

It will be understood that while the rolls are described as provided with points for effecting the venting, the form of the vent may be readily varied without departing from the spirit and scope of the invention.

Having described an illustrative embodiment of the invention without limiting the same thereto, what I claim as new and desire to secure by Letters Patent is:

1. A machine for venting cranberries comprising, in combination, a plurality of opposed coöperating rolls each having a multiplicity of sharp, needle-like, skin-venting points, closely adjacent to one another and of substantial length, means to hold said rolls in opposed relation with the ends of the points of one roll spaced from the ends of the points in the other roll sufficiently to prevent the crushing of the berries in their passage between said rolls, and means connected to said rolls for driving the same at substantially the same speed.

2. A machine for venting cranberries comprising, in combination, a plurality of opposed coöperating rolls each having a multiplicity of sharp, needle-like, skin-venting points, closely adjacent to one another and of substantial length, means to hold said rolls in opposed relation with the ends of the points of one roll spaced from the ends of the points in the other roll sufficiently to prevent the crushing of the berries in their passage between said rolls, means connected to said rolls for driving the same at substantially the same speed, and means located at the adjacent sides of the rolls to remove from the needles the berries impaled thereon.

3. A machine for venting cranberries comprising, in combination, a plurality of sets of rolls, each having a multiplicity of sharp, needle-like, skin-venting points closely adjacent to one another and of substantial length, means to hold the rolls of each set in opposed relation, and means connected to the rolls of each set for driving the rolls of such set at substantially the same speed, the axes of the rolls of one set being transverse to the axes of the rolls of the other set, whereby portions of a berry unpunctured by the first set are punctured by the second set.

In testimony whereof, I have signed my name to this specification, in the presence of two subscribing witnesses.

HENRY H. HARRISON.

Witnesses:
JOHN R. MOULTON,
HENRY T. WILLIAMS.

---

Copies of this patent may be obtained for five cents each, by addressing the "Commissioner of Patents, Washington, D. C."